United States Patent [19]

Metzner et al.

[11] Patent Number: 5,219,276
[45] Date of Patent: Jun. 15, 1993

[54] PUMP, IN PARTICULAR AN ENCLOSED MEDICAL PUMP

[75] Inventors: Dieter Metzner, Schweinfurt; Jürgen Rölle, Niederwerrn; Martin Prinz, Hammelburg, Raimond Walter, Schwebheim, all of Fed. Rep. of Germany

[73] Assignee: Fresenius AG, Bad Homburg v.d.H., Fed. Rep. of Germany

[21] Appl. No.: 841,181

[22] Filed: Feb. 25, 1992

[30] Foreign Application Priority Data

Feb. 27, 1991 [DE] Fed. Rep. of Germany ..... 41060601

[51] Int. Cl.$^5$ .................. F04B 17/00; F04B 35/04
[52] U.S. Cl. .................. 417/356; 417/423.7
[58] Field of Search .............. 417/356, 355, 423.7; 416/170 R

[56] References Cited

U.S. PATENT DOCUMENTS 2,711,286  6/1955  McAdam .
2,761,078  8/1956  McAdam ........................ 417/356
2,871,793  2/1959  Michie et al. .
4,688,998  8/1987  Olsen et al. ..................... 417/356
4,779,614 10/1988  Moise ............................. 417/356
4,957,504  9/1990  Chardack ........................ 417/356

FOREIGN PATENT DOCUMENTS 0578902  7/1959  Canada ........................ 417/423.7
2111402  6/1972  France .
0186986  8/1988  Japan ............................. 417/356
 621655  2/1981  Switzerland .

Primary Examiner—Richard A. Bertsch
Assistant Examiner—Alfred Basichas
Attorney, Agent, or Firm—Townsend and Townsend Khourie and Crew

[57] ABSTRACT

This invention relates to a pump (1) which is, in particular, constructed as an enclosed medical pump. To achieve an especially compact design, a pump section (6) which is connected to a rotor (5) of an electromagnetic drive means (2) for torque transmission is arranged inside said rotor (5) having a hollow interior.

11 Claims, 2 Drawing Sheets

PUMP, IN PARTICULAR AN ENCLOSED MEDICAL PUMP

BACKGROUND OF THE INVENTION

This invention relates to a pump, in particular an enclosed medical pump.

Such a pump is known from Swiss Patent Specification 621 655, which relates to a circulating pump for aquaria. The pump section of this pump is connected to the drive means via a shaft. The housing of the pump section is there flanged onto that of the drive means, so that the known pump requires a very large space. For this reason, the known pump cannot be used in all those fields where extremely small and compact external dimensions are of importance. This regards, above all, medicotechnical fields, in particular, applications for dialysis devices, or the like.

OBJECT OF THE INVENTION

It is therefore the object of the present invention to provide a pump, in particular, an enclosed medical pump, which is compact and has a high pumping capacity and is, nevertheless, inexpensive from a constructional point of view.

SUMMARY OF THE INVENTION

According to the invention, a pump constructed as an enclosed medical pump of compact design has a pump section inside a rotor having a hollow interior, the pump section being connected to the rotor of an electromagnetic drive means for torque transmission.

The pump of the invention is constructed such that the pump section forms an integral part of the drive means, which results in a very compact construction.

The stator of the pump of the invention may predominantly be designed like the stator of a multi-phase asynchronous motor and serves to produce a magnetic rotating field. The stator advantagously comprises slotted stator sheets, in the grooves of which the stator winding is uniformly arranged on and distributed over the circumference. The winding may here be a three- or four-phase winding. The alternating current which flows in phases produces a rotating magnetic field in accordance with the principle of an asynchronous motor. This field consists of rotating magnetic poles. The number of the poles corresponds to the pole number of the rotor. The rotor is in synchronism with the rotating field. This may be accomplished by controlling the rotating field speed by means of a sensor assembly through the feedback of the rotor position in an especially preferred embodiment. Alternatively, instead of a permanent-magnet rotor, a hysterisis rotor may be used. In this case, the sensor means can be dispensed with. The winding heads at both ends of the stator may be covered by two annular top members. These top members are positioned relative to the stator proper by means of fittings, for they will later on determine the exact position of both the rotor/pump unit and the sensor assembly.

In the simplest case, the permanent-magnet rotor may consist of an isotropically magnetizable material, e.g., an annular magnet having eight magnet poles arranged on the circumference. Alternatively, these poles may also be formed by segmental magnets of an anisotropic material. Ferrite magnets are advantageously used because of their special resistance to fluids.

At the drive side, one of the special advantages of the pump of the invention consists in that the brush wear of a conventional DC motor is here not observed due to the possible electronic commutation.

Movable parts of a conventional DC motor that are subject to wear, as well as the drive magnet for a magnetic coupling are not needed due to the direct drive of the pump segments via the stator.

Since the drive means exhibits the characteristics of a permanently energized DC motor, it starts in every position at a high starting torque in a directionally defined way and never stalls, even at load peaks. The motor current increases linearly with the load moment. As a consequence, a high efficiency can be expected throughout the operating range, which is not the case with synchronous or asynchronous motors.

The speed and thus the delivery rate of the pump can be controlled in a simple way, either by varying the operating voltage or through pulse width modulation of the power end stage.

Furthermore, the pump of the invention has the following constructional advantages:

Considerably less space is needed for the whole unit due to the concentric arrangement of drive means, rotor and pump section.

The combination of a direct drive with an advantageously volumetric pump results in an especially simple structure, since it only includes two moved parts.

Furthermore, there are special advantages resulting from a structure which can be easily manufactured and serviced due to a modular construction of the drive and control unit, which may consist of stator and sensor unit, and of the pump unit formed by the pump section.

Finally, it is ensured by the pump of the invention that the pump members of the pump section can be easily replaced.

The subclaims relate to advantageous developments of the invention.

When the pump section is designed as an internal gear pump, which advantageously includes an external gear and internal gear, the external gear can be fixedly connected to the rotor and is thus driven by the latter. The internal gear may be mounted on a fixed shaft which, in turn, is advantageously mounted on a support member which can simultaneously serve to support the rotor through an advantageously provided slide bush.

In an especially preferred embodiment, it is possible to combine the rotor, the slide bush and the external gear of the internal gear pump to form a unit. Slide bush and external gear are advantageously made of a plastic material and injection molded into the rotor. Both the slide bush and the external gear may be positioned in the interior of or inside the inner diameter of the rotor.

In another preferred embodiment, a circular sealing plate, preferably in the form of a steel plate, is mounted on the external gear to form a sealing surface at the front side.

The fixed shaft is eccentrically arranged relative to the support member, so that the function of the internal gear pump is ensured. The corresponding pressure and suction portions of the pump section are within the support member at the front side. A respective hole may lead from the pressure and suction portions through the support member to the outside of the pump and may terminate at that place in connection bushes, which are advantageously provided there.

A tap hole may be provided inside the rotor and pump chamber in a pressure duct, whereby the pressure produced by the pump section can also be observed inside the rotor and pump chamber. This creates a force component acting on the plate, which makes the pump self-sealing. Alternatively, this force component can be made variable by taking the following additional measure:

Suction and pressure sides of the pump section are provided with a connection hole that is closable more or less tightly by a throttle screw. This permit an infinitely variable performance adjustment of the pump at a given speed.

The special advantages of the pump of the invention resulting from the use of an internal gear pump section are, first of all, low-noise running during operation which is more silent than that of comparable external gear pumps.

Furthermore, the degree of irregularity as to the delivered volume becomes smaller due to the greater meshing in internal gear pumps.

The self-sealing effect in the pump of the invention has the following advantages:

First of all, axial gap dimensions are of no relevance.

Furthermore, there is no performance drift during the service life of the pump, since the pump adjusts itself.

The sealing plate may be rigidly connected to the external gear, which has the special advantage that frictional wear at the corresponding front side of the external gear is prevented.

The sealing plate is only subject to a small slide slip relative to the internal gear. Hence, in comparison with known solutions, the internal gear, too, is hardly subject to frictional wear at the respective front side.

Furthermore, in another, especially preferred embodiment of the pump of the invention, a separation or gap tube is provided for separating the fluids between stator and fluid-conveying pump chamber.

An extremely thin-walled tube of high-quality steel that serves to cover the inner surface of the stator is advantageously used as the separation or gap tube. This gap tube simultaneously overlaps the tops which cover the winding heads at both ends of the stator. To eliminate any tolerances, the gap tube may additionally be expanded after its installation, so that the tube rests sealingly on the stator and the top members.

The use of a thin-walled gap tube, which is expanded after having been inserted into the stator, leads to the following additional advantages due to its contact with the inner walls of the stator:

The selected wall thickness may be less than 0.1 mm, as the gap or separation tube need no longer exhibit an inherent stability.

It is possible to compensate for manufacturing tolerances of the inner diameter of the stator or the outer diameter of the gap tube.

The air gap between stator and rotor is minimized by the two above-mentioned measures, so that a maximally possible efficiency of the electromagnetic system is attainable.

Finally, in another, especially preferred embodiment, a sensor assembly, preferably in the form of a plurality of Hall sensors, may be provided for sensing the actual position of the rotor.

The sensor assembly may be positioned inside a housing opposite to the pump. The functional principle of an electronically commutated DC motor is obtained through feedback to the phase currents of the stator. Preferably three Hall sensors are needed for a three-phase stator, and two for a four-phase stator.

BRIEF DESCRIPTION OF THE INVENTION

Other details, features and advantages of the invention will become apparent from the following description of an embodiment taken in conjunction with the drawing, in which:

FIG. 1 shows a longitudinal section through an embodiment of a pump of the invention, and FIG. 2 shows a section through the pump of FIG. 1.

DESCRIPTION OF A PREFERRED EMBODIMENT OF THE INVENTION

The embodiment of a pump 1 of the invention, as is illustrated in the figures, may especially relate to an enclosed medical pump.

Figure 1:
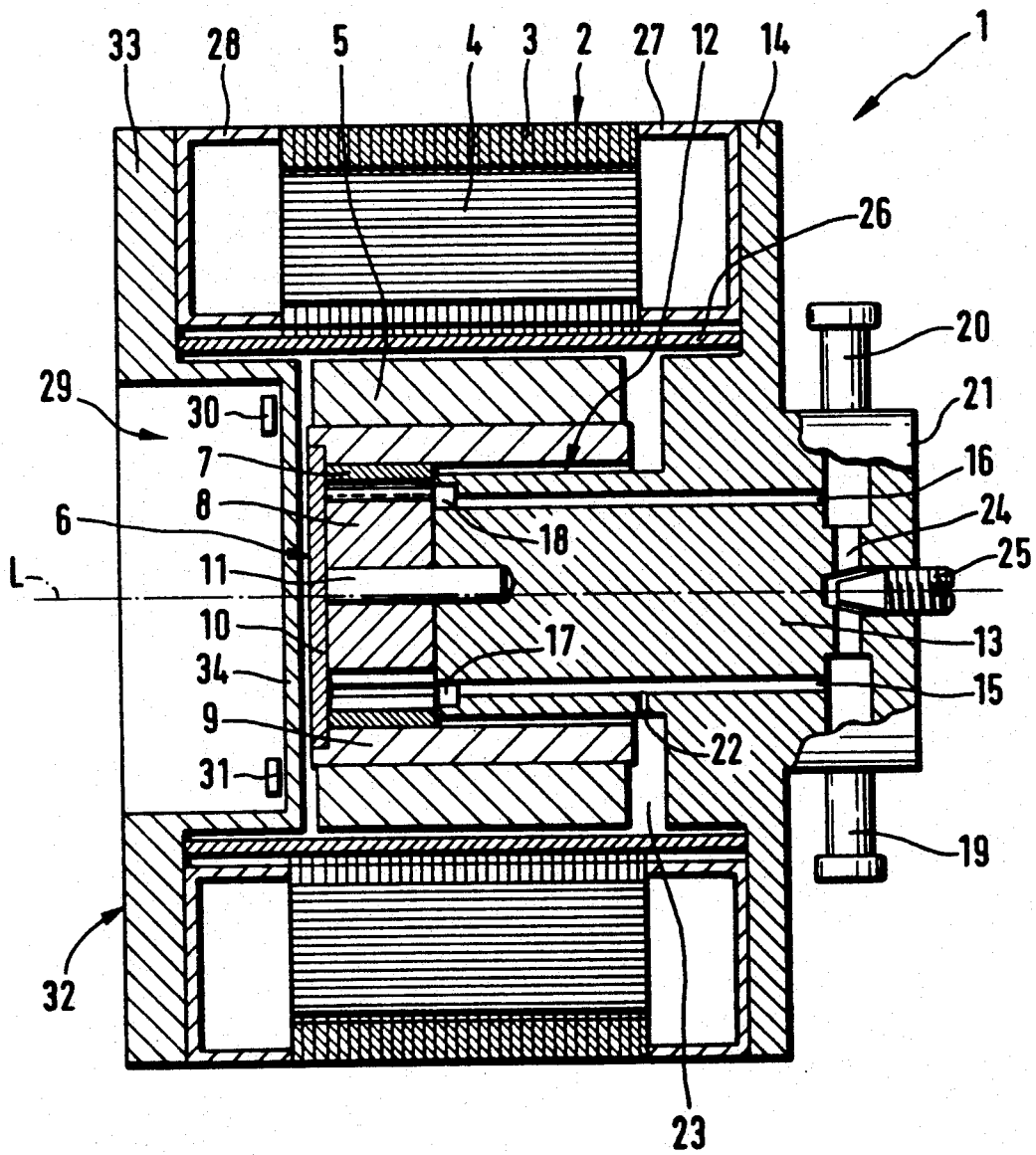
Figure 2:
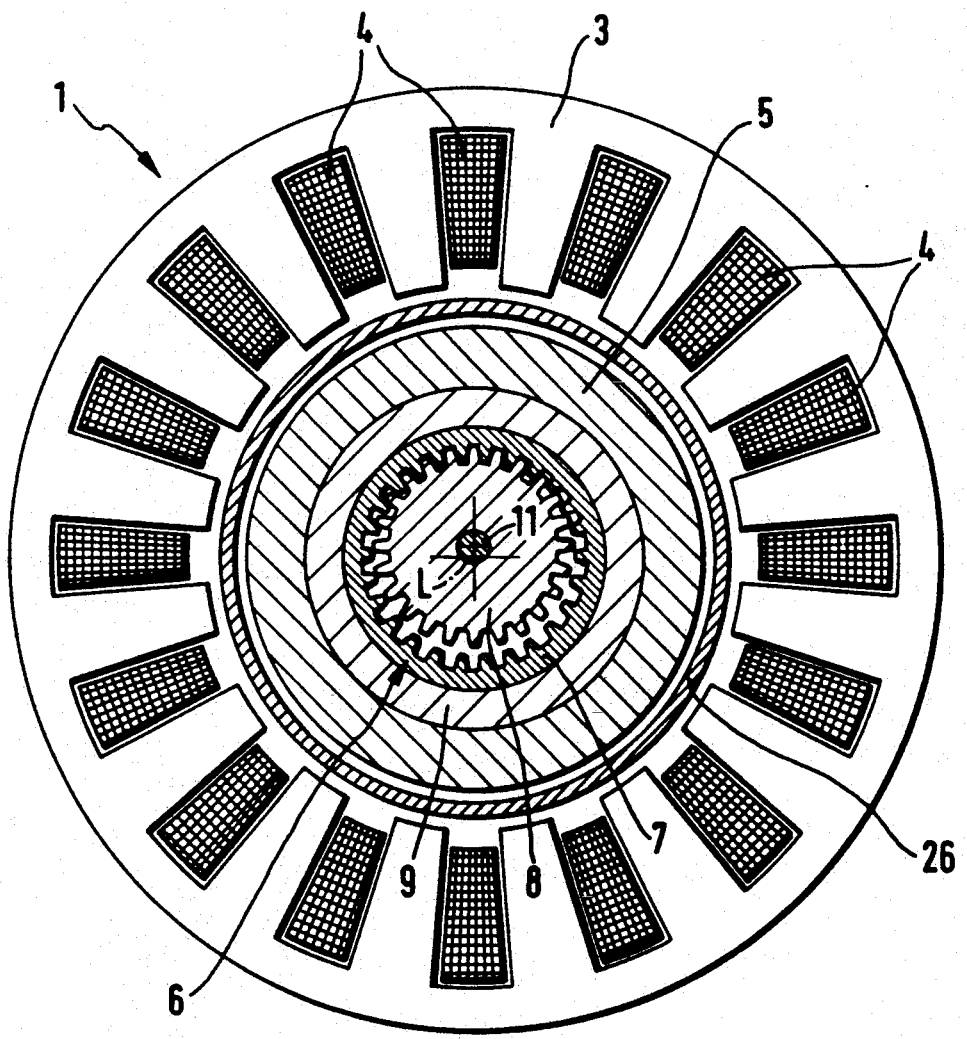

Pump 1 comprises a drive means 2 with a stator 3 including a plurality of stator windings 4, as becomes clearly apparent from FIG. 2. Furthermore, drive means 2 comprises a permanent-magnet rotor 5 which is concentrially arranged relative to stator 3 and disposed inside the hollow stator 3, as illustrated in FIGS. 1 and 2.

Furthermore, pump 1 includes a pump section 6 which is connected to rotor 5 for torque transmission. As becomes apparent from FIGS. 1 and 2, pump section 6 is arranged inside the hollow rotor 5, resulting in a very space-saving and compact construction of the inventive pump 1.

Pump section 6 is advantageously constructed as an internal gear pump and includes an external gear 7 and an internal gear 8 in meshing engagement therewith.

In the illustrated embodiment, the external gear 7 is connected to rotor 5. To this end, a slide bush 9 is provided between the external gear 7 and rotor 5. In an especially preferred embodiment, rotor 5, slide bush 9 and external gear 7 may form a unit. As illustrated in FIGS. 1 and 2, both slide bush 9 and external gear 7 are within the inner diameter of rotor 5.

Furthermore, FIG. 1 shows that a preferably circular sealing plate 10, especially in the form of a steel plate, is mounted on the external gear 7 for sealing purposes and for forming a front sealing surface.

Moreover, it follows from FIGS. 1 and 2 that the internal gear 8 is supported on a fixed shaft 11, which is, e.g., constructed as a pivot. Pivot 11, in turn, is mounted on a support member 12 which comprises a preferably cylindrical central portion 13. As becomes apparent from FIGS. 1 and 2, shaft 11 is eccentrically arranged relative to axis L of the central portion 13. This eccentric arrangement permits the functional operation of internal gear pump.

Furthermore, support member 12 comprises a surrounding flange 14 at the front side. This flange extends radially outwards, its outer diameter corresponding to that of stator 3. Flange 14 is integrally formed with the central portion 13 which is provided at both sides of axis L with respective through holes 15 and 16 that lead from the pressure and suction portions 17 and 18, respectively, to the external side of pump 1, terminating at said side in connection bushes 19 and 20, respectively. The connection bushes 19 and 20 are mounted on an attachment piece 21 extending outwards from the flange, which is integral with the central portion 13 and flange 14 in the present example, as follows from FIG. 1.

The suction and pressure portion is arranged on the face of the central portion 13 adjacent to the external and internal gears.

As is also shown in FIG. 1, a tap hole 22 is arranged in the central portion 13 and leads from the rotor and pump chamber 23 into the hole or pressure duct 15. As a result, the pressure produced by the pump also appears inside the rotor chamber 23. This creates a force component acting on the sealing plate 10, which makes the inventive pump 1 self-sealing.

Alternatively, this force component can be obtained by providing a connection hole 24 in the attachment member 21. This connection hole can be closed by a throttle screw 25 more or less tightly. As illustrated in FIG. 1, the connection hole 24 is connected to the pressure and suction ducts 15 and 16, thereby permitting an infinitely variable adjustment of the pumping capacity of the inventive pump 1 at a given rotational speed.

Furthermore, FIGS. 1 and 2 show the arrangement of a separation or gap tube 26 arranged between stator 3 and rotor 5 inside pump 1 of the invention. Gap tube 26 may be expanded after its assembly, so that it comes to rest sealingly on stator 3 and on top members 27 and 28 which are connected to stator 3 for covering windings 4. FIG. 1 shows that gap tube 26 overlaps top members 27 and 28.

FIG. 1 also shows that pump 1 of the invention comprises a sensor assembly 29 which may include a plurality of sensors, preferably in the form of Hall sensors, of which sensors 30 and 31 are shown in FIG. 1 for the present example. In the embodiment shown in FIG. 1, sensors 30 and 31 are arranged in a U-bent casing 32 opposite to pump section 6, namely in the wall-shaped central portion 34 projecting inwardly from a circumferential wall 33 at the front side. The sensor assembly 29 serves to sense the rotor position, the functional principle of an electronically commutated DC motor being implemented by the feedback to the phase currents of stator 3.

As far as a three-phase stator 3 is concerned, three Hall sensors are needed for the sensor assembly 29, while two Hall sensors are required for a four-phase stator 3.

We claim:

1. A pump (a), in particular an enclosed medical pump, comprising
   drive means (2) including a stator (3) with a plurality of stator windings (4), and a permanent-magnet rotor (5) concentrically arranged relative to said stator (3) within said stator;
   a pump section (6) arranged inside said rotor (5), said pump section comprising an internal gear pump, said internal gear pump having an internal gear (8) and an external gear (7), the external gear connected to said rotor (5) for torque transmission; and
   a support member (12), the support member having a shaft (11), through holes (15,16), pressure and suction portions (17,18), pump connection bushes (19,20), a tap hole (22) and a pump chamber (23); wherein
   said internal gear is rotatably connected to said shaft and arranged inside said external gear, in meshing engagement therewith;
   said through holes connect said pump connection bushes to said pressure and suction portions;
   said tap hole connects said pump chamber to said pressure portion; and
   wherein said external gear (7) includes a front sealing plate located at the side of said external gear facing away from said support member.

2. A pump according to claim 1, wherein said rotor (5) is supported by said support member (12).

3. A pump according to claim 2, further comprising a slide bush (9), wherein said rotor (5) is arranged via said slide bush (9) on said support member (12).

4. A pump according to claim 8, wherein said rotor (5), said slide bush (9) and said external gear (7) are made integral.

5. A pump according to claim 4, wherein said slide bush (9) and said external gear (7) are formed from a plastic material, said slide bush (9) and said external gear (7) having been set within said rotor (5) by injection molding.

6. A pump according to claim 1, wherein a separation tube (26) is arranged between said stator (3) and the external side of said rotor (5).

7. A pump according to claim 6, wherein said separation tube (26) is designed as a thin-walled tube of high-quality steel.

8. A pump according to claim 6, wherein said separation tube (26) sealingly rests on said stator (3).

9. A pump according to claim 1, further comprising a sensor assembly (29) for sensing the position of said rotor (5).

10. A pump according to claim 9, wherein said sensor assembly (29) is arranged in a housing part (32) disposed adjacent to said pump section (6).

11. A pump according to claim 9, wherein said sensor assembly comprises a plurality of Hall sensors (30, 31).

* * * * *